(12) United States Patent
Miyake et al.

(10) Patent No.: US 8,364,789 B2
(45) Date of Patent: Jan. 29, 2013

(54) AUTOMATIC ADDRESS ASSIGNMENT APPARATUS, CONTROL METHOD, AND PROGRAM

(75) Inventors: Shoichi Miyake, Kanagawa (JP); Kenji Fujisawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 268 days.

(21) Appl. No.: 12/453,187

(22) Filed: May 1, 2009

(65) Prior Publication Data

US 2009/0276508 A1 Nov. 5, 2009

Related U.S. Application Data

(63) Continuation of application No. 10/283,234, filed on Oct. 30, 2002, now abandoned.

(30) Foreign Application Priority Data

Nov. 2, 2001 (JP) .................................. 2001-338506

(51) Int. Cl.
*G06F 15/177* (2006.01)
(52) U.S. Cl. .......................... 709/220; 709/221; 709/222
(58) Field of Classification Search .................. 709/220, 709/221, 222
See application file for complete search history.

(56) References Cited

U.S. PATENT DOCUMENTS

| 4,390,984 | A | 6/1983 | Sugiura et al. |
|---|---|---|---|
| 6,360,330 | B1 | 3/2002 | Mutalik et al. |
| 6,424,654 | B1 | 7/2002 | Daizo |
| 2002/0065927 | A1* | 5/2002 | Janik et al. ................. 709/231 |
| 2002/0133573 | A1* | 9/2002 | Matsuda et al. ............. 709/220 |
| 2003/0005097 | A1 | 1/2003 | Barnard et al. |
| 2003/0055963 | A1 | 3/2003 | Butt et al. |

FOREIGN PATENT DOCUMENTS

JP 2000-209231 7/2000

OTHER PUBLICATIONS

Japanese Office Action; Application No. 2001-338506; dated: Dec. 25, 2006.

* cited by examiner

*Primary Examiner* — Philip Lee
(74) *Attorney, Agent, or Firm* — Rader, Fishman & Grauer PLLC

(57) ABSTRACT

When an automatic address assignment apparatus is operating in a network, another automatic address assignment apparatus stops the automatic address assignment service thereof. When a wireless LAN access point which functions as an automatic address assignment apparatus (DHCP server device) sends a DHCP discover message on the network and a DHCP offer message is returned as a response therefor, and when the address of the transmission source of the DHCP offer message does not match the IP address thereof, it is determined that another DHCP server exists on the network, and the DHCP server service of the former DHCP server is stopped. Thus, by avoiding contention with another DHCP server and by preventing confusion of the network, a wireless LAN access point suitable, in particular, for use in a small-scale office or a home network managed by an ordinary user having no knowledge of IP can be formed.

9 Claims, 8 Drawing Sheets

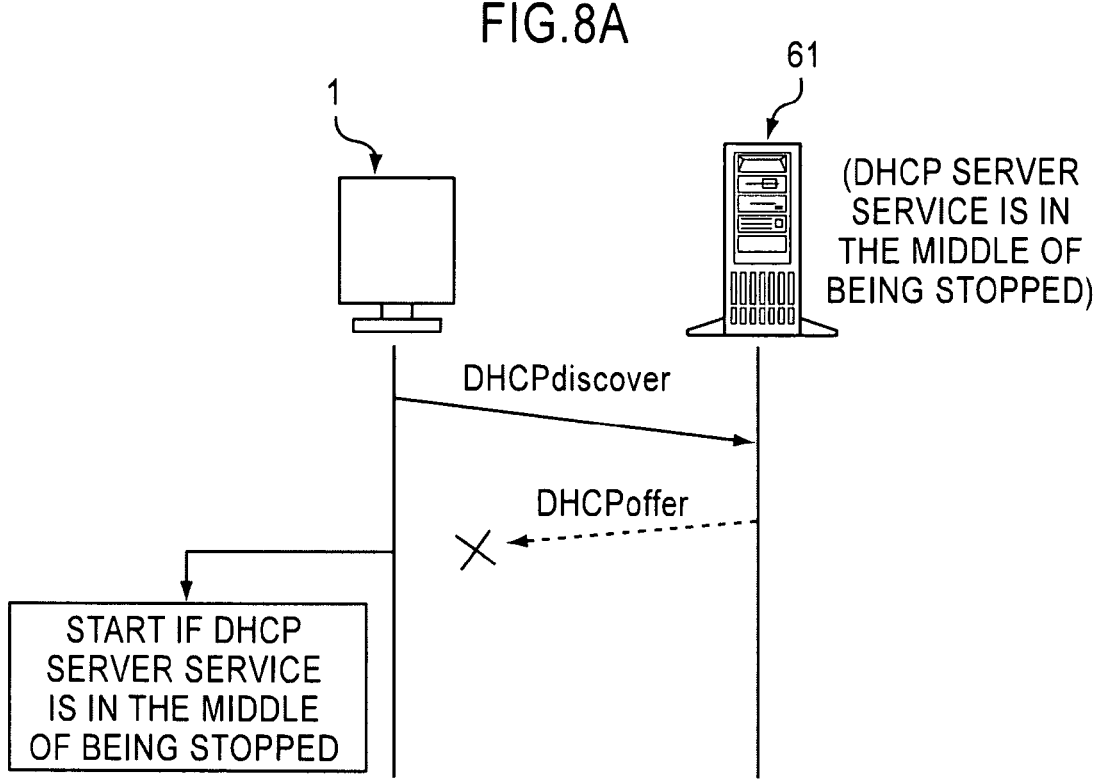
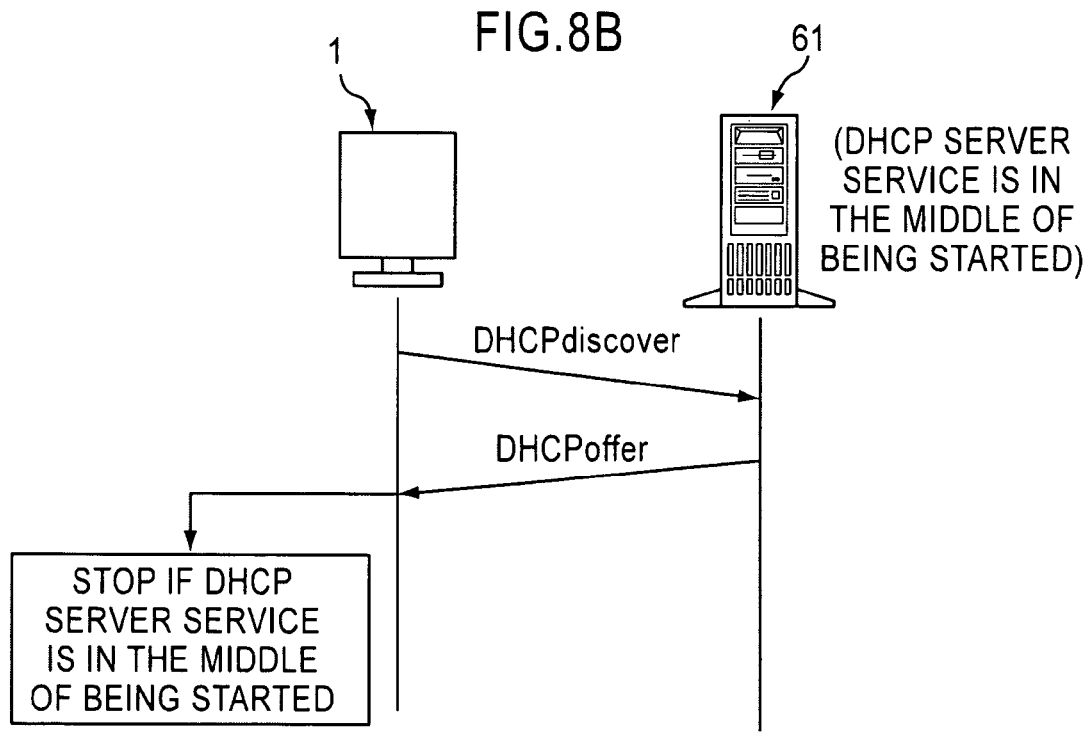

AUTOMATIC ADDRESS ASSIGNMENT APPARATUS, CONTROL METHOD, AND PROGRAM

CROSS REFERENCE TO RELATED APPLCIATIONS

The present application is a Continuation Application of the Parent Application No.: 10/283,234, filed Oct. 30, 2002, which claims priority from Japanese Application No. 2001-338506, filed on Nov. 2, 2001, the entire contents of which are incorporated herein by reference.

BACKGROUND OF THE INVENTION

1. Field of the Invention

The present invention relates to an automatic address assignment apparatus, a control method therefor, and a program therefor. More particularly, the present invention relates to an automatic address assignment apparatus for assigning an IP address to a DHCP (Dynamic Host Configuration Protocol) client connected to a network, a control method therefor, and a program therefor.

2. Description of the Related Art

In general, all terminals connected to a network compatible with TCP/IP (Transmission Control Protocol/Internet Protocol) are distinguished by specific identification information called an IP address. The operation for setting such an IP address is troublesome for users who do not have knowledge of the IP, and, also, mistakes of setting a duplicate IP address cannot be prevented.

Accordingly, an automatic address assignment apparatus (what is commonly called a DHCP server) is connected to a network, and an IP address is automatically assigned by the DHCP.

Terminals receiving an assignment of an IP address from the DHCP server are called DHCP clients. First, the DHCP client broadcasts a "DHCP discover message" on the network. The DHCP discover message contains the media access control (MAC) address of the DHCP client, for example, specific identification information that is given to, for example, an Ethernet (registered trademark) card.

When the DHCP server receives a DHCP discover message, the DHCP server broadcasts on the network a "DHCP offer message" in which the IP address of itself (the IP address of the DHCP server) is set at the address of the transmission source. Since this DHCP discover message contains the MAC address of the transmission source (the DHCP client) of the DHCP discover message, the DHCP client can recognize that it is a DHCP offer message destined to itself.

The DHCP client collects DHCP offer messages for a fixed time, and when one DHCP offer message is received during that collection period, the DHCP client transmits a REQUEST message to the DHCP server which has transmitted the DHCP offer message. Alternatively, when a plurality of DHCP offer messages are received, the DHCP client selects one of the messages, and transmits a REQUEST message to the DHCP server which has transmitted that DHCP offer message. The REQUEST message contains information about which IP address is desired to be used. The DHCP server receiving the REQUEST message returns an acknowledgement (ACK) message if the IP address to be assigned is not yet used.

In the manner described above, in response to a request from each terminal (DHCP client) in the network, the DHCP server searches for an unused IP address from the range of IP addresses managed by itself and lends (also called leases) the address to a DHCP client (terminal) of the requesting source. The DHCP server is indispensable for a small-scale office or a home network, in particular, where a specialized network administrator cannot be assigned.

However, a conventional, automatic address assignment device leases an IP address to a requesting source in response to a request from a DHCP client. For example, when a plurality of DHCP servers exist on the network, contention of the DHCP servers is caused to occur, and confusion is brought about on the network. In such a case, in the network where there is a specialized administrator or a user who is familiar with IP technology, contention can be avoided by stopping unnecessary DHCP servers or by making the range in which the respective DHCP servers (sub-net masks) are in charge different. However, in a small-scale office or in a home network where there is not such an administrator or user, solution of a trouble is not easy, and the network cannot be used at all until a recovery from the trouble is made.

SUMMARY OF THE INVENTION

Accordingly, an object of the present invention is to provide an easy-to-use, automatic address assignment apparatus which is capable of stopping the DHCP server service of itself when another automatic address assignment apparatus is operating in a network and which can thereby be connected to the network without being conscious of contention, even for a network (home network, etc.) managed by an ordinary user who does not have knowledge of IP.

To achieve the above-mentioned object, the present invention provides an automatic address assignment apparatus for lending an address to a client apparatus connected to a network, the automatic address assignment apparatus comprising: sending means for sending search information for searching for an automatic address assignment apparatus in the network; first determination means for determining whether or not predetermined information is transmitted from an automatic address assignment apparatus which exists on the network in response to the sending of the search information; second determination means for determining whether or not the address of the transmission source of the predetermined information differs from the address of itself; and stopping means for stopping the automatic address assignment service if the automatic address assignment service of itself is in the middle of being started when the determination result of the second determination means is yes.

In the present invention, when search information as a response therefor is sent to the network and predetermined information is returned from the automatic address assignment apparatus which exists on the network, and when the address thereof does not match the address of the transmission source of the predetermined information, it is determined that another automatic address assignment apparatus exists on the network, and the automatic address assignment service of that apparatus is stopped.

Therefore, contention with another automatic address assignment apparatus can be avoided, and confusion of the network can be prevented. Thus, an automatic address assignment apparatus suitable, in particular, for use in a small-scale office or a home network managed by an ordinary user having no knowledge of the IP can be formed.

BRIEF DESCRIPTION OF THE DRAWINGS

FIGS. 8A and 8B show exchanges of messages between the wireless LAN access point 1 and the DHCP server 61.

DESCRIPTION OF THE PREFERRED EMBODIMENTS

Embodiments of the present invention will be described below with reference to the drawings by using, as an example, an application to a "wireless LAN access point", which is one of network devices having a DHCP server function. Various specifications of details, actual examples, and examples of numerical values, character strings, and other symbols in the following description are only references for clarifying the concept of the present invention, and it is clear that the concept of the present invention is not limited by all or a part of them. Furthermore, detailed descriptions of the known method, the known procedure, the known architecture, the known circuit configuration, etc. (hereafter "known matters") are avoided. This also is for simplifying the descriptions, and all or part of these known matters are not excluded intentionally. Since such known matters can be known by the person skilled in the art at the time of the application for a patent, of course, these are included in the following description.

The configuration of the wireless LAN access point 1 will be described first.

Figure 1A:
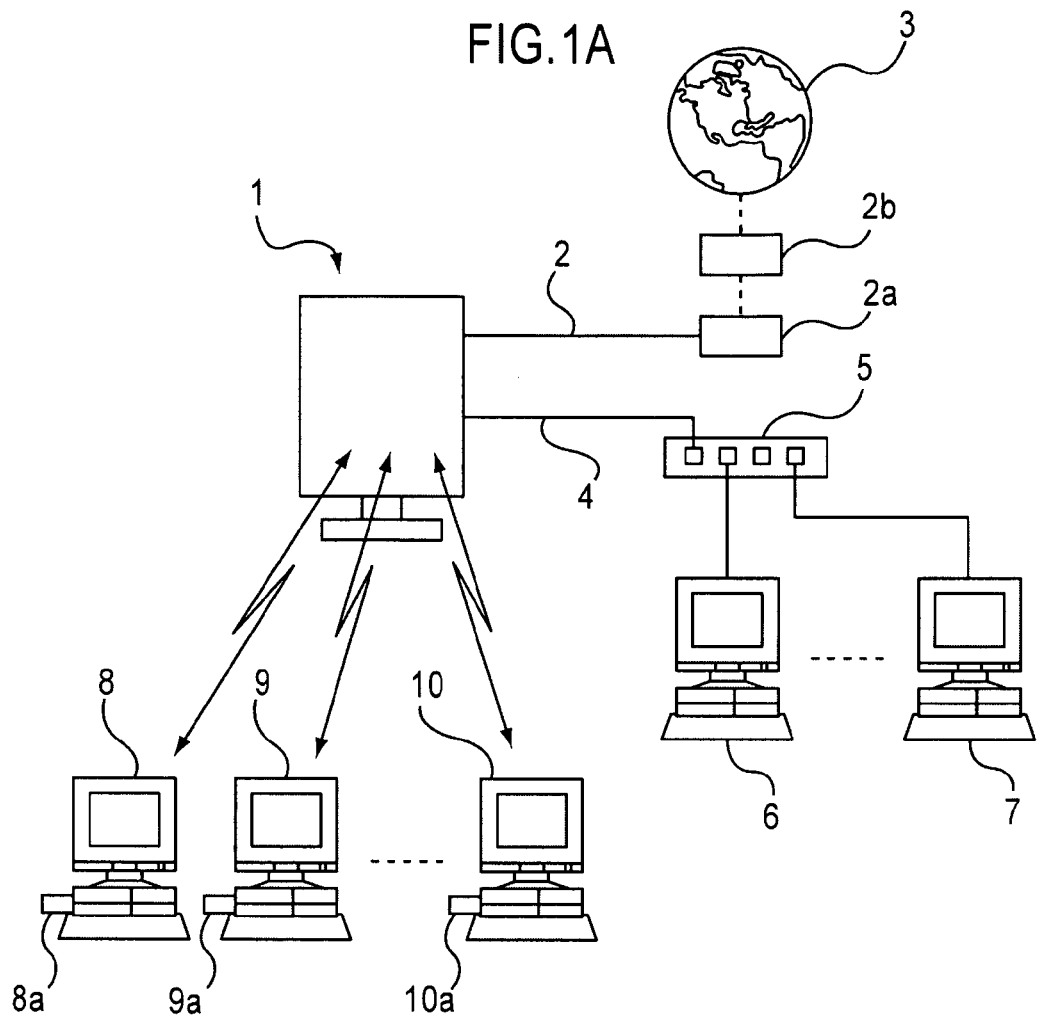
FIG. 1A is a configuration diagram of a network including wireless LAN access points.
Figure 1B:
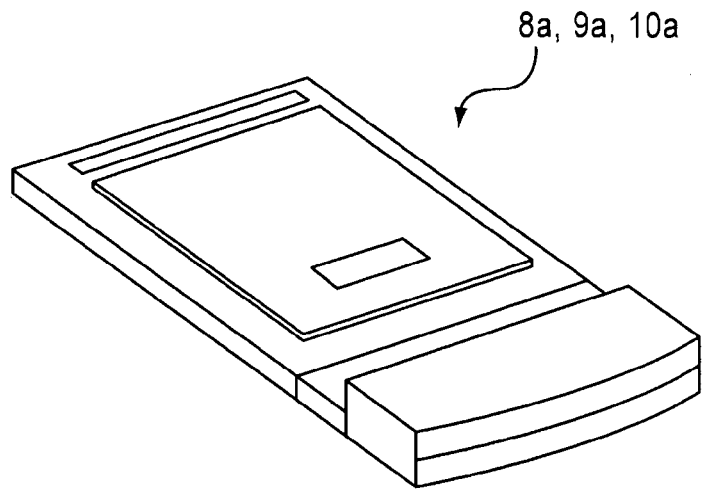
FIG. 1B is a perspective view of a LAN card.

FIG. 1A is a configuration diagram of a network including wireless LAN access points. A wireless LAN access point 1 corresponds to the DHCP server device described in the gist of the present invention. The wireless LAN access point 1, together with a plurality of Internet terminals 6, 7, 8, 9, and 10, form a small-scale network (for example, a home network) in which a wired network and a wireless network coexist. In more detail, an Internet network 3 is connected to the wireless LAN access point 1 via a DSL (Digital Subscriber Line) modem (or a cable modem or an ISDN router) 2a and an Internet service provider (ISP) 2b through the cable 2. Furthermore, the Internet terminals 6 and 7 are connected to the wireless LAN access point 1 via a cable 4 and a hub 5 (a line concentration device). In addition, the Internet terminals 8, 9, and 10 are connected to the wireless LAN access point 1 via a wireless communication medium complying with a predetermined wireless communication standard (for example, IEEE 802.11a, 802.11b, or 802.11g). The Internet terminals 8, 9, and 10, which are connected in a wireless manner, have wireless LAN cards (or boards) 8a, 9a, and 10a of the above-described communication standard, shown in FIG. 1B, mounted thereon.

Figure 2:
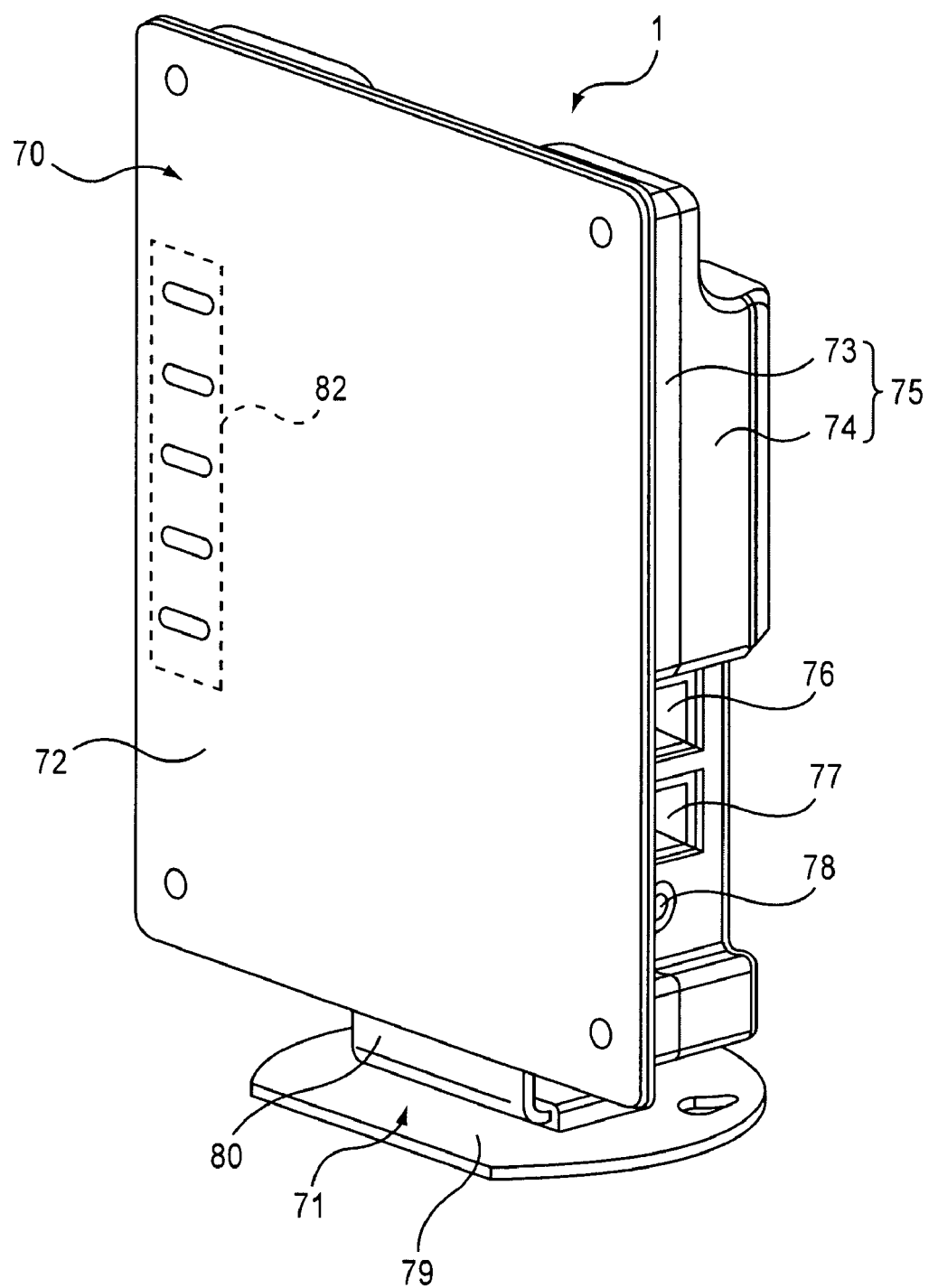
FIG. 2 is a perspective view of the front of a wireless LAN access point 1.
Figure 3:
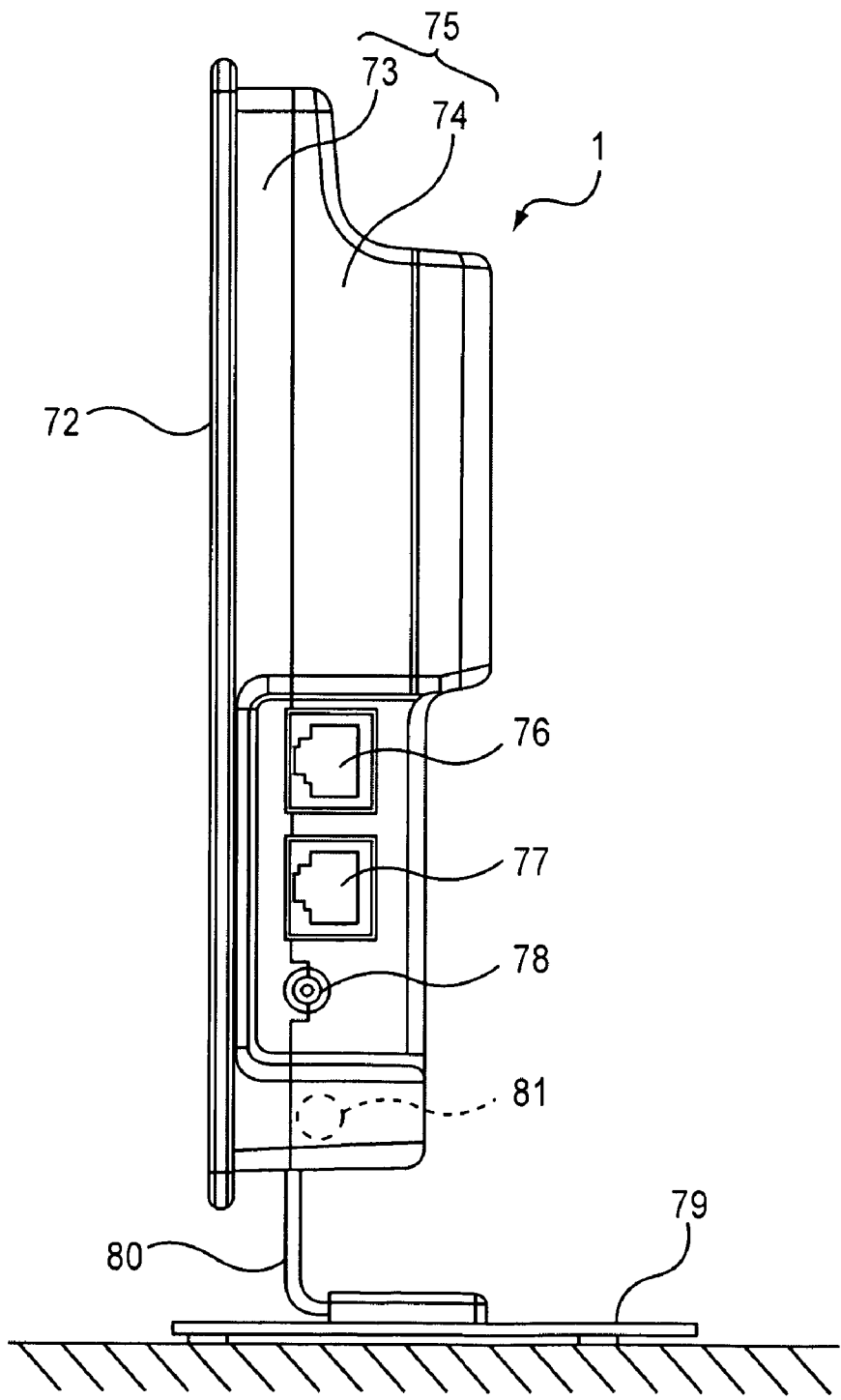
FIG. 3 is a side view of the wireless LAN access point 1.

FIG. 2 is a perspective view of the front of the wireless LAN access point 1. FIG. 3 is a side view of the wireless LAN access point 1. The outer shape of the wireless LAN access point 1 now will be described with reference to FIGS. 2 and 3. The wireless LAN access point 1 comprises a main unit 70 of the device and a stand device 71. The main unit 70 comprises a front panel section 72 having a group of lamps 82 formed of a plurality of display lamps (for convenience sake, five lamps are shown in FIG. 2), and a cabinet unit 75 formed of a top cabinet 73 and a bottom cabinet 74. In the cabinet unit 75, a wireless transmission/receiving antenna, etc., are housed, and the side section of the cabinet unit 75 is provided with an Ethernet (registered trademark) terminal 76 on the WAN side (hereinafter referred to as a "WAN terminal"), an Ethernet terminal 77 on the LAN side (hereinafter referred to as a "LAN terminal"), and an power-supply terminal 78.

The stand device 71 comprises a base section 79, a holding section 80, fixed below the main unit 70, for holding the main unit 70 in a substantially upright posture, and a pivoting section 81, provided between the base section 79 and the holding section 80, for pivoting the base section 79 by 90 degrees toward the rearward side with respect to the holding section 80.

Figure 4:
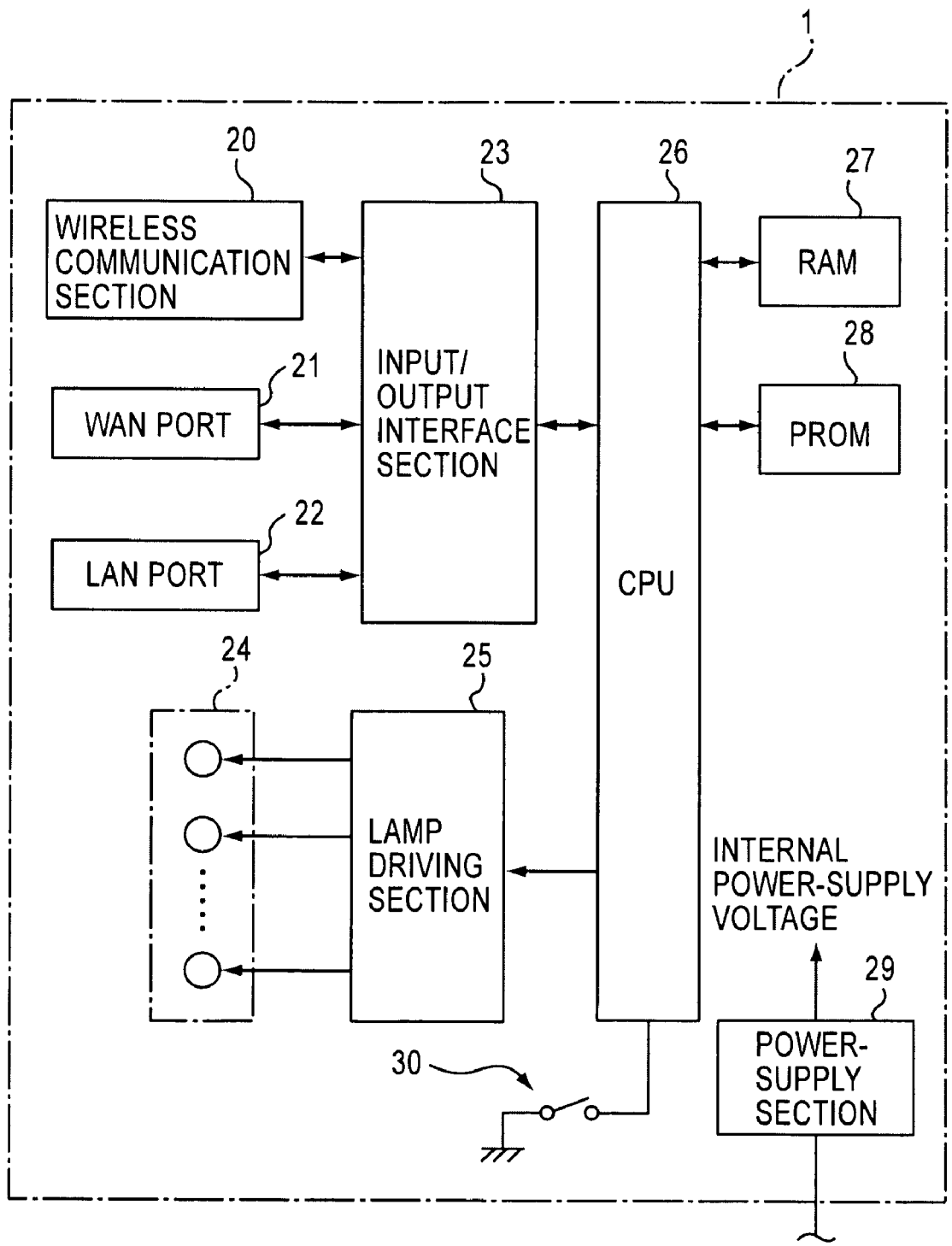
FIG. 4 is an internal electrical block diagram of the wireless LAN access point 1.

FIG. 4 is an internal electrical block diagram of the wireless LAN access point 1. In FIG. 4, the wireless LAN access point 1 comprises a wireless communication section 20, a WAN port 21, a LAN port 22, an input/output interface section 23, a display section 24, a lamp driving section 25, a microcomputer unit (hereinafter abbreviated as a "CPU") 26, a volatile information storage section (hereinafter referred to as a "RAM") 27, an electrically rewritable non-volatile information storage section (hereinafter referred to as a "PROM") 28, a power-supply section 29, and a reset switch 30. The functions of these sections are described below.

<Wireless Communication Section 20>

Figure 5:
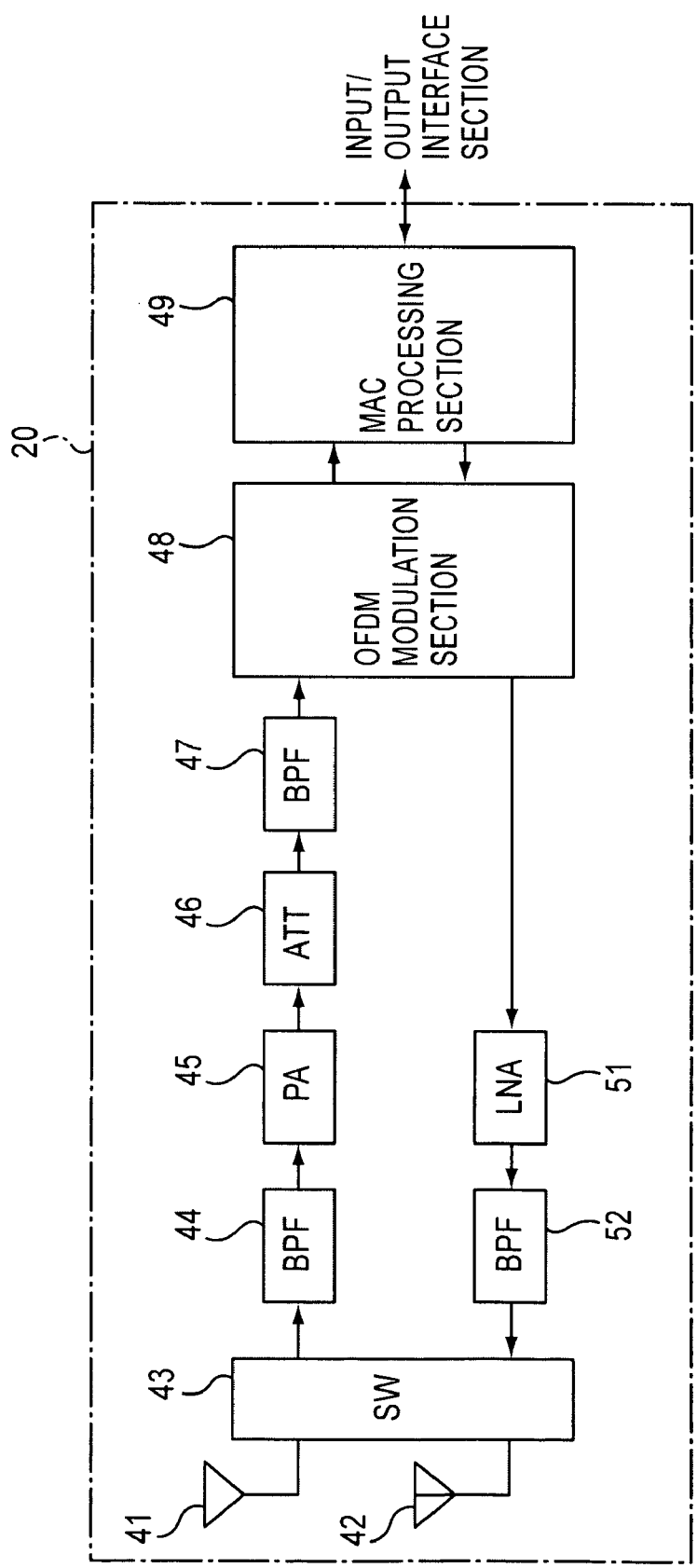
FIG. 5 is a block diagram of a wireless communication section 20.

FIG. 5 is a block diagram of the wireless communication section 20. The wireless communication section 20 is a wireless transmission/receiving section complying with, for example, IEEE 802.11b. The wireless communication section 20 comprises two antennas 41 and 42 of a diversity method, a switch section 43 for switching between these antennas, a pre-band-pass filter (BPF) 44 for removing an unwanted signal from the received signal, a power amplifying section (PA) 45, a π-type attenuator 46 for removing an excess signal, a post-band-pass filter (BPF) 47 for extracting necessary signal components from the received signal after passing through these sections, an orthogonal frequency division multiplexing (OFDM) modulation/demodulation section 48, a MAC processing section 49 for performing control of a layer 2 with respect to the transmission/receiving signal, a low-noise amplifier (LNA) 51 for amplifying a transmission signal after orthogonal frequency division multiplexing modulation, and a band-pass filter (BPF) 52 for removing an unwanted radiation signal from the transmission signal.

<WAN Port 21 and LAN Port 22>

The WAN port 21 corresponds to the WAN terminal 76 provided on the side section of the cabinet unit 75. The LAN port 22 corresponds to the LAN terminal 77 provided on the side section of the cabinet unit 75. The Internet network is connected to the WAN port 21, and a wired LAN is connected to the LAN port 22.

<Input/Output Interface Section 23>

The input/output interface section 23 is used to interface for inputting/outputting signals among the wireless communication section 20, the WAN port 21, the LAN port 22, and the CPU 26.

<Display Section 24>

The display section 24 corresponds to a group of lamps 82 formed of a plurality of display lamps provided in the front panel section 72. Examples of these lamps include a POWER lamp, a MESSAGE lamp, a WIRELESS lamp, a NETWORK-1 lamp, a NETWORK-2 lamp. The POWER lamp is switched on when power is supplied. The MESSAGE lamp is switched on when a log message is collected in the access point (switched off when the log is displayed). The WIRELESS lamp is switched on (blinks during transmission/reception of data) when wireless transmission/reception of data is possible. The NETWORK-1 lamp is switched on (blinks during transmission/reception of data) when a cable is connected to the WAN port 21 (WAN terminal 76). The NETWORK-2 lamp 2 is switched on (blinks during transmission/reception of data) when a cable is connected to the LAN port 22 (LAN terminal 77).

<Lamp Driving Section 25>

The lamp driving section 25 drives each display lamp of the display section 24 in accordance with a control signal from the CPU 26 so as to switch on/off or blink each display lamp.

<CPU 26>

The CPU 26 functions as the sending means, the first determination means, and the second determination means described in the gist of the present invention. The CPU 26 loads a control program prestored in the PROM 28 into the RAM 27 and executes the control program. Thus, while predetermined data are input from each section (the wireless communication section 20, the WAN port 21, and the LAN port 22) via the input/output interface section 23, the CPU 26 performs various computation processes required to control the entire operation of the wireless LAN access point 1 and outputs various pieces of control data obtained as a result of the computations to each section (the wireless communication section 20, the WAN port 21, and the LAN port 22) via the input/output interface section 23.

<RAM 27 and PROM 28>

The RAM 27 is used as a work area for the CPU 26. The PROM 28 stores the control program in such a manner as to be electrically rewritable and stores various pieces of variable data, such as the IP address of the wireless LAN access point 1, the sub-net mask, the lending range of the IP addresses of the DHCP servers, or the lending status, in such a manner as to be electrically rewritable.

<Power-Supply Section 29 and Reset Switch 30>

The power-supply section 29 receives the supply of DC power from a power-supply adaptor (not shown), generates internal power for the wireless LAN access point 1, and outputs it to each section. The reset switch 30 is used to return variable data stored in the PROM 28 to initial data before shipment from the factory.

Next, the operation of the wireless LAN access point 1 will be described.

The wireless LAN access point 1 of this embodiment operates not only as an access point of the wireless network, but also as an IP router (remote router) for making seamless connection between the internal network (LAN) in which a wired network and a wireless network coexist and the external network (WAN), such as the Internet. Furthermore, the wireless LAN access point 1 operates as a DHCP server indispensable for the IP router.

The basic role of the IP router is to perform mutual address conversion between the IP address of an IP packet on the WAN side and the IP address of an IP packet on the LAN side by using a so-called NAT (Network Address Translation) function which performs IP packet address conversion in order to provide a one-to-one seamless connection environment between the Internet terminals 6, 7, 8, 9, and 10 and the Internet network 3. Such a NAT function is well known, and, in addition, it is not directly related to the present invention. Accordingly, descriptions thereof are omitted in the following description.

Figure 6:
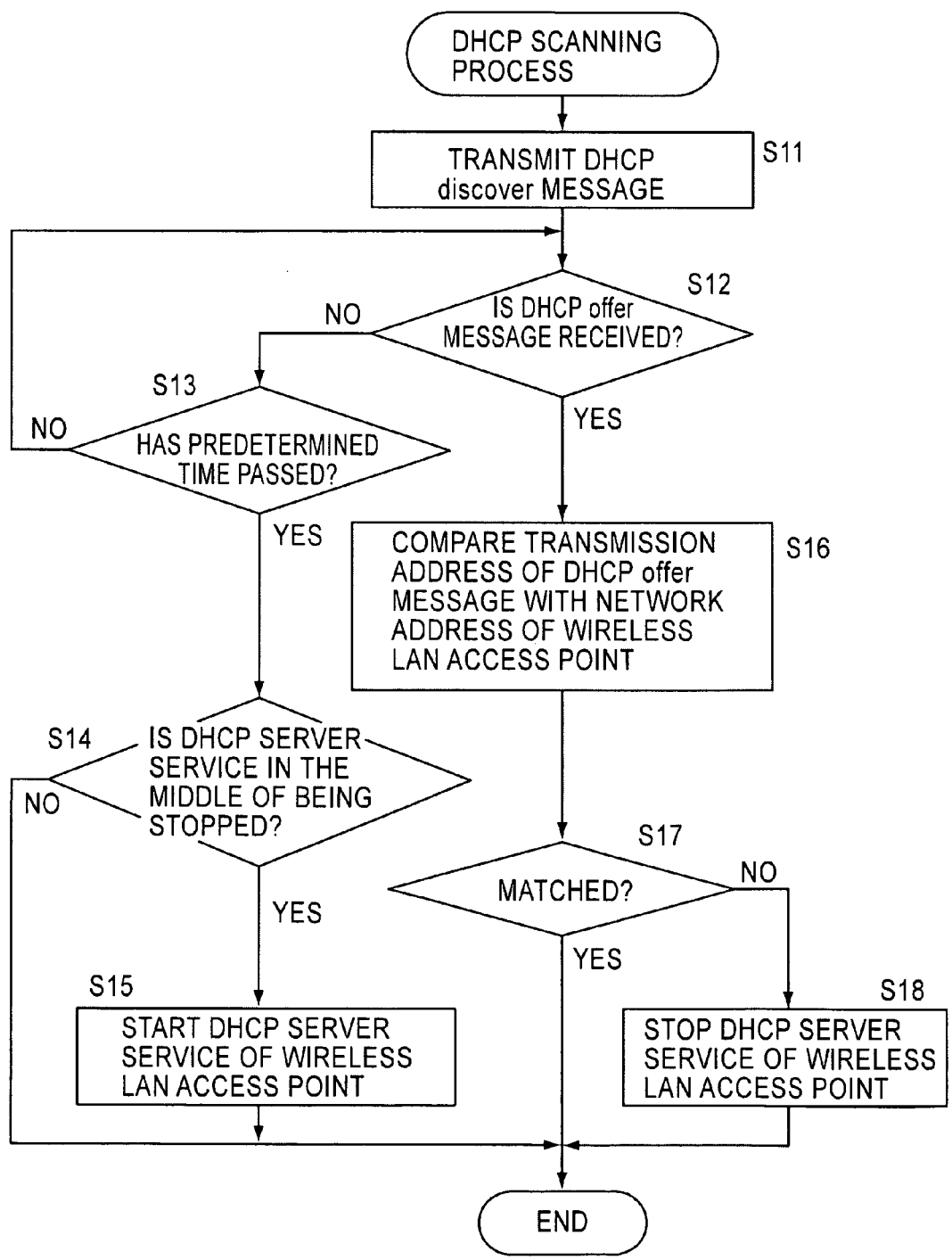
FIG. 6 is a flowchart of a DHCP scanning program.

FIG. 6 is a flowchart of a part of a control program (hereinafter referred to as a "DHCP scanning program") executed by the CPU 26. This DHCP scanning program includes indispensable matters for this embodiment, as will become clear from the following description. The DHCP scanning program is repeatedly executed periodically or at a predetermined pattern in a state in which the power supply of the wireless LAN access point 1 is switched on. For the above pattern, for example, the DHCP scanning program may be executed continuously several times every several seconds, and, thereafter, an interval (pause period) of approximately one minute can be taken.

When the DHCP scanning program is executed, first, a "DHCP discover message" is transmitted on the network (via the LAN port 22 (the LAN terminal 77) in the wired network, and via the wireless communication section 20 in the wireless network) in which a wired network and a wireless network coexist (step S11). Next, it is determined whether or not a "DHCP offer message" is received via the network in which a wired network and a wireless network coexist (step S12). When the determination result is "NO", it is determined whether or not a predetermined waiting time has passed (step S13). If the waiting time has not passed, the determination of step S12 is repeated. If the waiting time has passed, it is determined whether or not the DHCP server service of the wireless LAN access point 1 is in the middle of being stopped (step S14). When the DHCP server service of the wireless LAN access point 1 is in the middle of being stopped, the DHCP server service is started (step S15), after which the program is terminated directly. If the DHCP server service of the wireless LAN access point 1 is not in the middle of being stopped, the program is terminated directly.

According to the above, even if a DHCP discover message is transmitted on the network, when a response (DHCP offer message) therefor is not returned from anywhere, it is determined that even one DHCP server does not exist on the network and that the DHCP server service of the wireless LAN access point 1 also is in the middle of being stopped, and the DHCP server service of the wireless LAN access point 1 can be started to respond to the IP address request from the DHCP client on the network.

When, on the other hand, the determination result of step S12 is "YES", that is, when it is determined that the "DHCP offer message", has been received via the LAN port 22 (the LAN terminal 77), next, the IP address which is set at the address of the transmission source of the DHCP offer message is compared with the IP address of the wireless LAN access point 1 (step S16) in order to determines whether or not they match (step S17).

Here, the IP address of the wireless LAN access point 1 can be seen from the DHCP client (the Internet terminals 6, 7, 8, 9, and 10) connected to the LAN port 22 (the LAN terminal 77), and it is the IP address of the requesting source when those DHCP clients make a request of lending of the IP address to the wireless LAN access point 1.

Therefore, when the determination result of step S17 is "YES", that is, when the IP address which is set at the address of the transmission source of the DHCP offer message matches the IP address of the wireless LAN access point 1, a DHCP discover message is transmitted to itself (the wireless LAN access point 1), and the DHCP offer message from itself has been received. Therefore, in this case, another DHCP server does not exist on the network, in other words, only one DHCP server service (service of the wireless LAN access point 1) exists on the network, and the contention of the DHCP servers does not occur. Therefore, the program is terminated directly.

However, when the determination result of step S17 is "NO", that is, when the IP address which is set at the address of the transmission source of the DHCP offer message does not match the IP address of the wireless LAN access point 1, it follows that a DHCP offer message from another DHCP server other than itself (the wireless LAN access point 1) has been received. In this case, since an inconvenience (contention of the DHCP servers) described at the beginning occurs, after the DHCP server service of the wireless LAN access point 1 is stopped in order to avoid contention (step S18), the program is terminated.

The foregoing now will be described with reference to the drawings.

Figure 7:
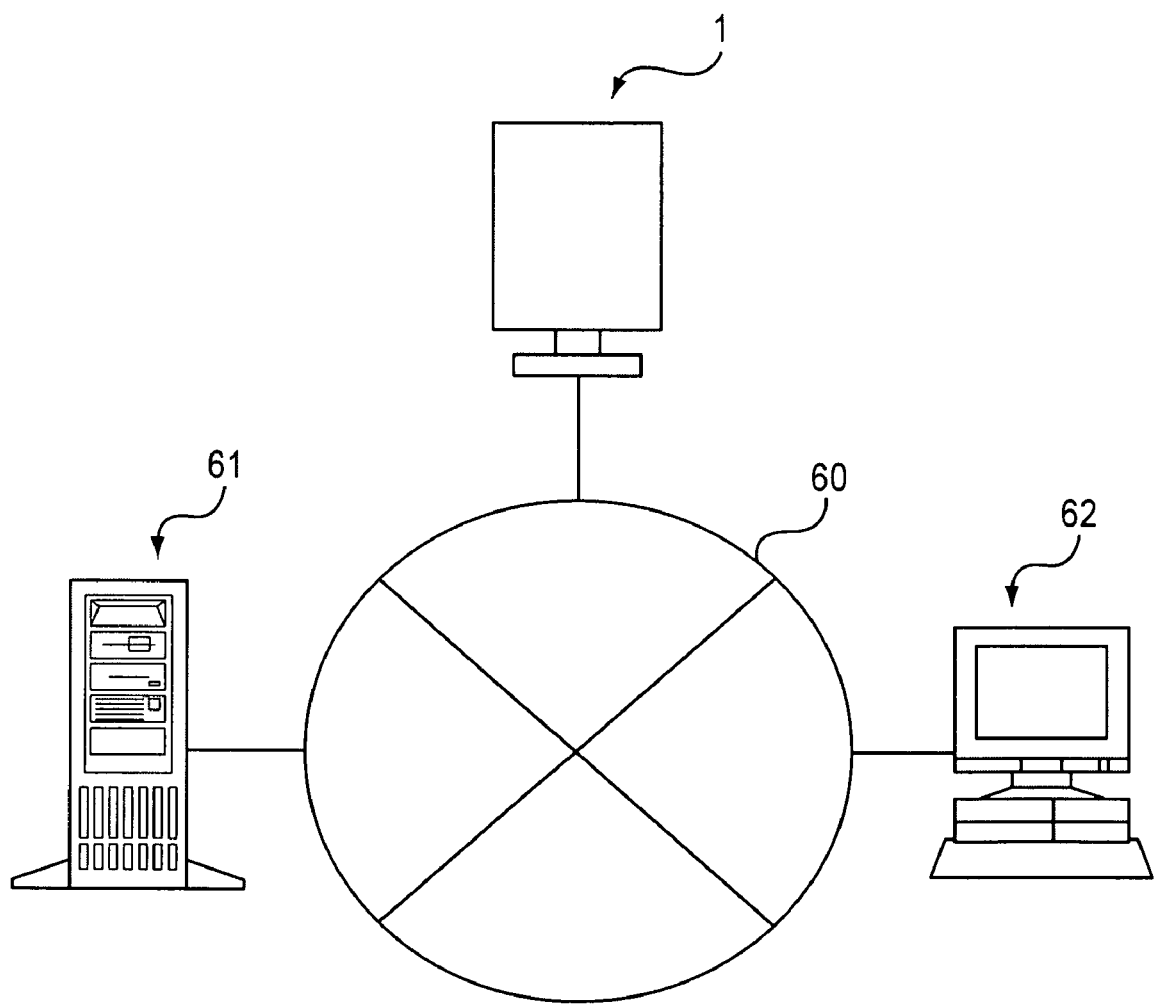
FIG. 7 shows a state in which the wireless LAN access point 1, a DHCP server 61, and a DHCP client 62 are connected to a network 60.

FIG. 7 shows a state in which the wireless LAN access point 1, another DHCP server 61, and a DHCP client 62 are connected to a network 60. FIGS. 8A and 8B show exchanges of messages between the wireless LAN access point 1 and the DHCP server 61.

When the DHCP server 61 is in the middle of being stopped (or is disconnected from the network 60) (FIG. 8A), the DHCP discover message from the DHCP client 62 is received by the wireless LAN access point 1, and the wireless LAN access point 1 returns a DHCP offer message in response to that message, with the result that the IP address can be assigned to the DHCP client 62 without any problems. However, when the DHCP server 61 also is in the middle of operation (FIG. 8B), the DHCP discover message from the DHCP client 62 is received by both the wireless LAN access point 1 and the DHCP server 61, and two DHCP offers are returned from them, with the result that contention of the DHCP servers occurs, and the inconvenience of bringing about confusion to the network occurs.

In such a case, the wireless LAN access point 1 in this embodiment performs the above-described "DHCP scanning program", thereby transmitting a DHCP discover message to the DHCP server 61. When a DHCP offer as a response therefor is received, it is determined that a DHCP server other than the wireless LAN access point 1 itself exists on the network and the DHCP server is in the middle of operation, and the DHCP server service of the wireless LAN access point 1 is stopped. Therefore, it is possible to avoid the contention of the DHCP servers, prevent confusion of the network, and solve the problems described at the beginning.

As has thus been described, according to the wireless LAN access point 1 of this embodiment, even when another DHCP server exists in the network, contention with that DHCP server does not occur, and confusion of the network can be effectively avoided. Therefore, it is possible to form the wireless LAN access point 1 which is suitable, in particular, for use in a small-scale office or a home network managed by an ordinary user who does not have knowledge of the IP.

In the above description, although the wireless LAN access point 1 is used as an example, this is only one embodiment. As described above, the wireless LAN access point 1 may be a network device having a DHCP server function. For example, the wireless LAN access point 1 may be a server computer itself which is performing a DHCP server service equipped standard in a general-purpose OS (Operating System), may be various network devices (an IP router, a cable modem, an ISDN modem, a DSL modem, an ISDN router, etc.) in which a DHCP server service is incorporated in advance as an internal function, or may be a set top box having a DHCP server function for controlling information of household appliances that are used by being connected to a network. Alternatively, a DHCP server service may be incorporated into any type of appliance as long as the wireless LAN access point 1 is a "device connected to a network", such as a video cassette recorder, a satellite broadcasting receiver, a television, a PDA (Personal Digital Assistant), a printer, a refrigerator, a washing machine, or an automobile, regardless of whether the network is wired or wireless. Furthermore, a protocol other than the protocol defined by DHCP may be used. Furthermore, the wireless LAN access point 1 may be used in a case where a 128-bit IP address used in IPv6 (Internet Protocol version 6) is lent.

The main functions of this embodiment are functionally realized by organic coupling of hardware resources including a CPU and software resources, such as an OS and various programs. For the hardware resources and the OS, since general-purpose ones can be used, indispensable matters for the present invention can be said to be substantially summed up in the "DHCP scanning program" of FIG. 6. Therefore, the present invention covers recording media (not only media itself which is distributed on a distribution channel, but also that which provides only recorded contents on a network is included), such as a floppy (registered trademark) disk, a MO, a CD, a hard disk, or a semiconductor memory, in which all or the main portions of the DHCP scanning program are stored.

The invention claimed is:

1. A method for managing an address assignment service of a wireless network access point apparatus of a wireless network, the method comprising:

sending a message to search for an automatic address assignment apparatus in a local area network including the wireless network;

determining whether a message offering to perform address assignment is received in response to sending the message to search for an automatic address assignment apparatus;

determining whether the address assignment service of the wireless network access point apparatus is in a stopped state;

starting the address assignment service of the wireless network access point apparatus upon determining that the message offering to perform address assignment has not been received and upon determining that the address assignment service of the wireless network access point apparatus is in a stopped state; and stopping the address assignment service of the wireless network access point apparatus upon determining that the message offering to perform address assignment has been received and upon determining that the message offering to perform address assignment is from another apparatus, wherein a sequence of sending the message to search for an automatic address assignment service, determining whether a message offering to perform address assignment is received, and starting or stopping the address assignment service of the wireless network access point apparatus is performed repeatedly according to a predetermined time interval while the wireless network access point apparatus remains in operation for the wireless network; and wherein the sequence is performed according to Dynamic Host Configuration Protocol (DHCP).

2. The method according to claim 1, further comprising: initially determining whether a predetermined time has passed without receiving the message offering to perform address assignment before determining whether the address assignment service of the wireless network access point apparatus is in the stopped state.

3. The method according to claim 1, wherein the message to search for an automatic address assignment apparatus comprises a DHCP discover message and the message offering to perform address assignment comprises a DHCP offer message.

4. A system for managing an address assignment service of a wireless network access point apparatus of a wireless network, the system comprising:

a hardware processor;
program code for sending a message to search for an automatic address assignment apparatus in a local area network including the wireless network;
program code for determining whether a message offering to perform address assignment is received in response to sending the message to search for an automatic address assignment apparatus;
program code for determining whether the address assignment service of the wireless network access point apparatus is in a stopped state; and
program code for starting the address assignment service of the wireless network access point apparatus upon determining that the message offering to perform address assignment has not been received and upon determining that the address assignment service of the wireless network access point apparatus is in the stopped state, and for stopping the address assignment service of the wireless network access point apparatus upon determining that the message offering to perform address assignment has been received and upon determining that the message offering to perform address assignment is from another apparatus,
wherein a sequence of sending the message to search for the automatic address assignment service, determining whether the message offering to perform address assignment is received, and starting or stopping the address assignment service of the wireless network access point apparatus is performed repeatedly according to a predetermined time interval while the wireless network access point apparatus remains in operation for the wireless network; and
wherein the sequence is performed according to Dynamic Host Configuration Protocol (DHCP).

5. The system according to claim 4, further comprising:
program code for initially determining whether a predetermined time has passed without receiving the message offering to perform address assignment before determining whether the address assignment service of the wireless network access point apparatus is in the stopped state.

6. The system according to claim 4, wherein the message to search for an automatic address assignment apparatus comprises a DHCP discover message and the message offering to perform address assignment comprises a DHCP offer message.

7. A computer program product for managing an address assignment service of a wireless network access point apparatus of a wireless network, the computer program product comprising program code stored on a non-transitory computer readable medium and configured to perform operations comprising:
sending a message to search for an automatic address assignment apparatus in a local area network including the wireless network;
determining whether a message offering to perform address assignment is received in response to sending the message to search for an automatic address assignment apparatus;
determining whether the address assignment service of the wireless network access point apparatus is in a stopped state;
starting the address assignment service of the wireless network access point apparatus upon determining that the message offering to perform address assignment has not been received and upon determining that the address assignment service of the wireless network access point apparatus is in the stopped state; and
stopping the address assignment service of the wireless network access point apparatus connected to the wireless network upon determining that the message offering to perform address assignment has been received and upon determining that the message offering to perform address assignment is from another apparatus,
wherein a sequence of sending the message to search for the automatic address assignment service, determining whether the message offering to perform address assignment is received, and starting or stopping tile address assignment service of the wireless network access point apparatus is performed repeatedly according to a predetermined time interval while the wireless network access point apparatus remains in operation for the wireless network; and
wherein the sequence is performed according to Dynamic Host Configuration Protocol (DHCP).

8. The computer program product according to claim 7, further comprising:
initially determining whether a predetermined time has passed without receiving the message offering to perform address assignment before determining whether the address assignment service of the wireless network access point apparatus is in the stopped state.

9. The computer program product according to claim 7, wherein the message to search for an automatic address assignment apparatus comprises a DHCP discover message and the message offering to perform address assignment comprises a DHCP offer message.

* * * * *